(12) United States Patent
Kwon et al.

(10) Patent No.: US 10,979,894 B2
(45) Date of Patent: Apr. 13, 2021

(54) METHOD AND DEVICE FOR ALLOCATING ADDRESS OF DEVICE IN BLUETOOTH MESH NETWORK

(71) Applicant: LG ELECTRONICS INC., Seoul (KR)

(72) Inventors: Younghwan Kwon, Seoul (KR); Jinkwon Lim, Seoul (KR); Jingu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 30 days.

(21) Appl. No.: 15/570,120

(22) PCT Filed: May 2, 2016

(86) PCT No.: PCT/KR2016/004619
§ 371 (c)(1),
(2) Date: Oct. 27, 2017

(87) PCT Pub. No.: WO2016/175638
PCT Pub. Date: Nov. 3, 2016

(65) Prior Publication Data
US 2018/0160301 A1     Jun. 7, 2018

Related U.S. Application Data

(60) Provisional application No. 62/154,741, filed on Apr. 30, 2015, provisional application No. 62/201,619, filed on Aug. 6, 2015.

(51) Int. Cl.
*H04W 8/26* (2009.01)
*H04L 29/12* (2006.01)
(Continued)

(52) U.S. Cl.
CPC ............ *H04W 8/26* (2013.01); *H04L 61/2038* (2013.01); *H04L 61/2069* (2013.01); *H04W 4/06* (2013.01);
(Continued)

(58) Field of Classification Search
CPC ....... H04W 8/26; H04W 8/005; H04W 12/06; H04W 12/4604; H04W 4/00;
(Continued)

(56) References Cited

U.S. PATENT DOCUMENTS

| 8,699,377 B2 * | 4/2014 | Veillette ................. H04L 45/34 370/254 |
| 9,009,792 B1 * | 4/2015 | Scofield .................. G06F 21/43 370/255 |

(Continued)

*Primary Examiner* — Jeffrey M Rutkowski
*Assistant Examiner* — Luna Weissberger
(74) *Attorney, Agent, or Firm* — Birch, Stewart, Kolasch & Birch, LLP

(57) ABSTRACT

The present invention relates to a method and a device for a first device setting the address of a second device through a Bluetooth mesh network wherein a setting message for setting the address is transmitted to the second device, and a first status message is received from the second device as a response to the setting message, the first status message comprising status information indicating whether the setting of the address was successful, and the setting message comprises at least one among an address field comprising an address value to be used by the second device in the Bluetooth mesh network or a first identifier indicating a request or no request for a response to the setting message.

7 Claims, 15 Drawing Sheets

(51) Int. Cl.
*H04W 4/80* (2018.01)
*H04W 4/06* (2009.01)
*H04W 12/06* (2021.01)
*H04W 84/18* (2009.01)
*H04W 8/00* (2009.01)

(52) U.S. Cl.
CPC ............. *H04W 4/80* (2018.02); *H04W 12/06* (2013.01); *H04W 8/005* (2013.01); *H04W 84/18* (2013.01)

(58) Field of Classification Search
CPC ..... H04W 84/18; H04W 84/04; H04W 88/06; H04L 61/2069; H04L 61/2038; H04L 61/20; H04L 29/08; H04L 29/04; H04L 29/02
USPC .......................................................... 370/338
See application file for complete search history.

(56) References Cited

U.S. PATENT DOCUMENTS

| | | | |
|---|---|---|---|
| 9,602,297 B2* | 3/2017 | Kakani | H04L 12/189 |
| 2003/0012219 A1 | 1/2003 | Joo | |
| 2003/0099212 A1 | 5/2003 | Anjum et al. | |
| 2007/0149122 A1 | 6/2007 | Murphy | |
| 2012/0057518 A1* | 3/2012 | Herrala | H04W 84/20 |
| | | | 370/315 |
| 2013/0045684 A1* | 2/2013 | Linde | H04W 80/02 |
| | | | 455/41.2 |
| 2013/0109313 A1* | 5/2013 | Kneckt | H04W 8/005 |
| | | | 455/41.2 |
| 2014/0018002 A1* | 1/2014 | Jose | H04W 4/80 |
| | | | 455/41.2 |
| 2014/0341112 A1* | 11/2014 | Agiwal | H04L 67/14 |
| | | | 370/328 |
| 2014/0348061 A1* | 11/2014 | Salkintzis | H04W 48/08 |
| | | | 370/328 |

* cited by examiner

Mesh network protocol stack (a)

| MSB 7 | 6 | 5 | 4 | 3 | 2 | 1 | LSB 0 |
|---|---|---|---|---|---|---|---|
| End bit | Transaction ID | | | | | | |

(a)

| MSB 7 | 6 | 5 | 4 | 3 | 2 | 1 | LSB 0 |
|---|---|---|---|---|---|---|---|
| End bit | Message Types | | Transaction ID | | | | |

(b)

| MSB 7 | 6 | 5 | 4 | 3 | 2 | 1 | LSB 0 |
|---|---|---|---|---|---|---|---|
| End bit | Ack | Transaction ID | | | | | |

(c)

| MSB 7 | 6 | 5 | 4 | 3 | 2 | 1 | LSB 0 |
|---|---|---|---|---|---|---|---|
| End bit | Transaction ID | | | | | | |

(d)

METHOD AND DEVICE FOR ALLOCATING ADDRESS OF DEVICE IN BLUETOOTH MESH NETWORK

CROSS REFERENCE TO RELATED APPLICATIONS

This application is the National Phase of PCT International Application No. PCT/KR2016/004619, filed on May 2, 2016, which claims priority under 35 U.S.C. 119(e) to U.S. Provisional Application No. 62/154,741, filed on Apr. 30, 2015, and No. 62/201,619, filed on Aug. 6, 2015, all of which are hereby expressly incorporated by reference into the present application.

TECHNICAL FIELD

The present invention relates to a method and device for allocating an address of a device in Bluetooth, a short-range wireless technology, in a wireless communication system, and more particularly, to a method and device for transmitting/receiving data by setting an address of a device in a Bluetooth mesh network.

BACKGROUND ART

Bluetooth is an NFC technology standard allowing various devices to be wirelessly connected in a near field to exchange data. If two devices attempt to perform wireless communication using Bluetooth communication, a user may perform a procedure for discovering a Bluetooth device with which he or she wants to communicate and requesting a connection. In the present invention, the device may refer to equipment or an apparatus.

In this case, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since the transmission distance of Bluetooth is limited to a maximum of 100 m, Bluetooth is suitable for being used within a limited space.

DISCLOSURE

Technical Problem

The present invention provides a method for transmitting/receiving data using Bluetooth low energy (BLE) technology.

The present invention also provides a method for Bluetooth devices to transmit/receive data by forming a mesh network.

The present invention also provides a method for Bluetooth devices to transmit/receive data to/from even a remote device in a relay manner by forming a mesh network.

The present invention also provides a method for a Bluetooth device to set an address of another device in a mesh network.

The present invention also provides a data format for a Bluetooth device to set an address of a device to which the Bluetooth device wants to transmit data through a mesh network.

The present invention also provides a method for a Bluetooth device to obtain an address of a device to which the Bluetooth device wants to transmit data through a mesh network.

The present invention also provides a data format for a Bluetooth device to obtain an address of a device to which the Bluetooth device wants to transmit data through a mesh network.

The present invention also provides a method for a Bluetooth device to receive a response with respect to data transmitted through a mesh network.

The present invention also provides a data format for a Bluetooth device to receive a response with respect to data transmitted through a mesh network.

Technical subjects obtainable from the present invention are non-limited by the above-mentioned technical task. And, other unmentioned technical tasks can be clearly understood from the following description by those having ordinary skill in the technical field to which the present invention pertains

Technical Solution

In an aspect, a method for setting, by a first device, an address of a second device through a Bluetooth mesh network includes: transmitting a setting message for setting an address to the second device; and receiving a first status message including status information indicating whether setting of an address has been successful in response to the setting message from the second device, wherein the setting message includes at least one of an address field including an address value used by the second device in the Bluetooth mesh network or a first identifier indicating whether a response to the setting message is requested.

Also, in the present invention, the address value may be one of an address value of a source device, an address value of a destination device, and an address value of a group containing the second device.

Also, in the present invention, the method may further include: transmitting a get message for getting an address of the second device to the second device; and receiving a second status message including an address value of the second device in response to the get message.

Also, in the present invention, the get message may include a second identifier indicating whether to request a response to the get message.

Also, in the present invention, the method may further include: transmitting a message including Bluetooth data to the second device, wherein the message includes at least one of a source device address field indicating an address of a device transmitting a message and a destination device address field indicating an address of a device receiving a message.

Also, in the present invention, the source device address field may include an address value of the first device and the destination device address field may include an address value of the second device.

Also, in the present invention, when an address field of the destination device may include the address value of the group, the message may be transmitted every device of the group.

Also, in the present invention, the setting message and the first status message may be transmitted and received through a Bluetooth GATT protocol.

Also, in the present invention, the method may further include: transmitting an advertising message to the second device; receiving a connection request message from the second device on the basis of the advertising message; and performing an authentication procedure with the second device.

In another aspect, a device, as a first device, for setting an address of a second device through a Bluetooth mesh network includes: a communication unit communicating with the exterior wirelessly or wiredly; and a processor functionally connected to the communication unit, wherein the processor performs control to transmit a setting message for setting an address to the second device and receive a first status message including status information indicating whether setting of an address has been successful in response to the setting message from the second device, wherein the setting message includes at least one of an address field including an address value used by the second device in the Bluetooth mesh network or a first identifier indicating whether a response to the setting message is requested Advantageous Effects According to the method for controlling a device using the Bluetooth BR/EDR low energy (LE) technology according to an embodiment of the present invention, connection between other devices may be controlled by a control device.

Also, in the present invention, since Bluetooth devices transmit and receive data by forming a mesh network, data may be transmitted even to a remote device.

Also, in the present invention, an address of a device forming a mesh network may be set.

Also, in the present invention, by periodically transmitting an address of a device forming a mesh network to other devices, an address of a device which wants to transmit data may be known.

Also, in the present invention, since a device forming a mesh network transmits data to another device within the network and receives a response thereof, whether the other device has received data may be known.

Advantages and effects of the present invention that may be obtained in the present invention are not limited to the foregoing effects and any other technical effects not mentioned herein may be easily understood by a person skilled in the art from the present invention and accompanying drawings

DESCRIPTION OF DRAWINGS

FIG. 13 is a view illustrating an example of a data format to which the present invention may be applied.

BEST MODES

The aforementioned objects, features and advantages of the present invention will become more apparent through the following detailed description related to the accompanying drawings. Hereinafter, the embodiments of the present invention will be described with reference to the accompanying drawings, in which the same reference numbers refer to the same elements throughout the specification. In describing the present invention, a detailed description of the known functions and constitutions related to the present invention will be omitted if it is deemed to make the gist of the present invention unnecessarily vague.

Hereinafter, a method and apparatus related to the present invention will be described in detail with reference to the accompanying drawings. The suffixes of elements used in the following description, such as "module" and "unit", are assigned or interchangeably used by taking into consideration only the easy of the writing of the specification, but they in themselves do not have different meanings or roles.

Hereinafter, in the present invention, a component may refer to a device or a specific component operating within a device and may be mixedly used together with a device or a node.

Figure 1:
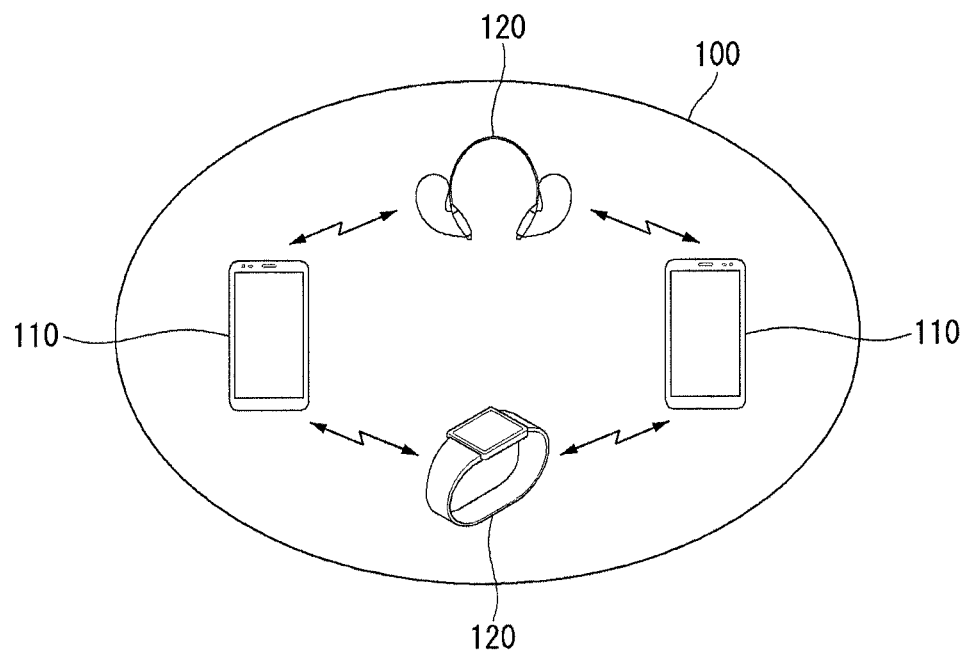
FIG. 1 is a schematic diagram showing an example of a wireless communication system using a Bluetooth LE technology to which the present invention may be applied.

FIG. 1 is a schematic diagram showing an example of a wireless communication system using a Bluetooth LE technology to which the present invention may be applied.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Furthermore, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, and the like, and the client device 110 may be expressed as a master device, a master, a client, a member, a sensor device, a sink device, a collector, a second device, a third device, and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Furthermore, in order to provide data information to the client device, the server device sends a notification message or an indication message to the client device in order to provide data information to the client device. Furthermore, the server device receives a confirmation message corresponding to the indication message from the client device.

Furthermore, in the process of transmitting and receiving notification, indication, and confirmation messages to and from the client device, the server device may provide data information to a user through a display unit or may receive a request input from the user through a user input interface.

Furthermore, in the process of transmitting and receiving message to and from the client device, the server device may read data from a memory unit or may write new data to the corresponding memory unit.

Furthermore, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Furthermore, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Furthermore, the wireless communication system may configure personal area networking (PAN) through the Bluetooth technology. For example, in the wireless communication system, a private piconet may be established between devices to quickly and safely exchange files, documents, and the like.

Figure 2:
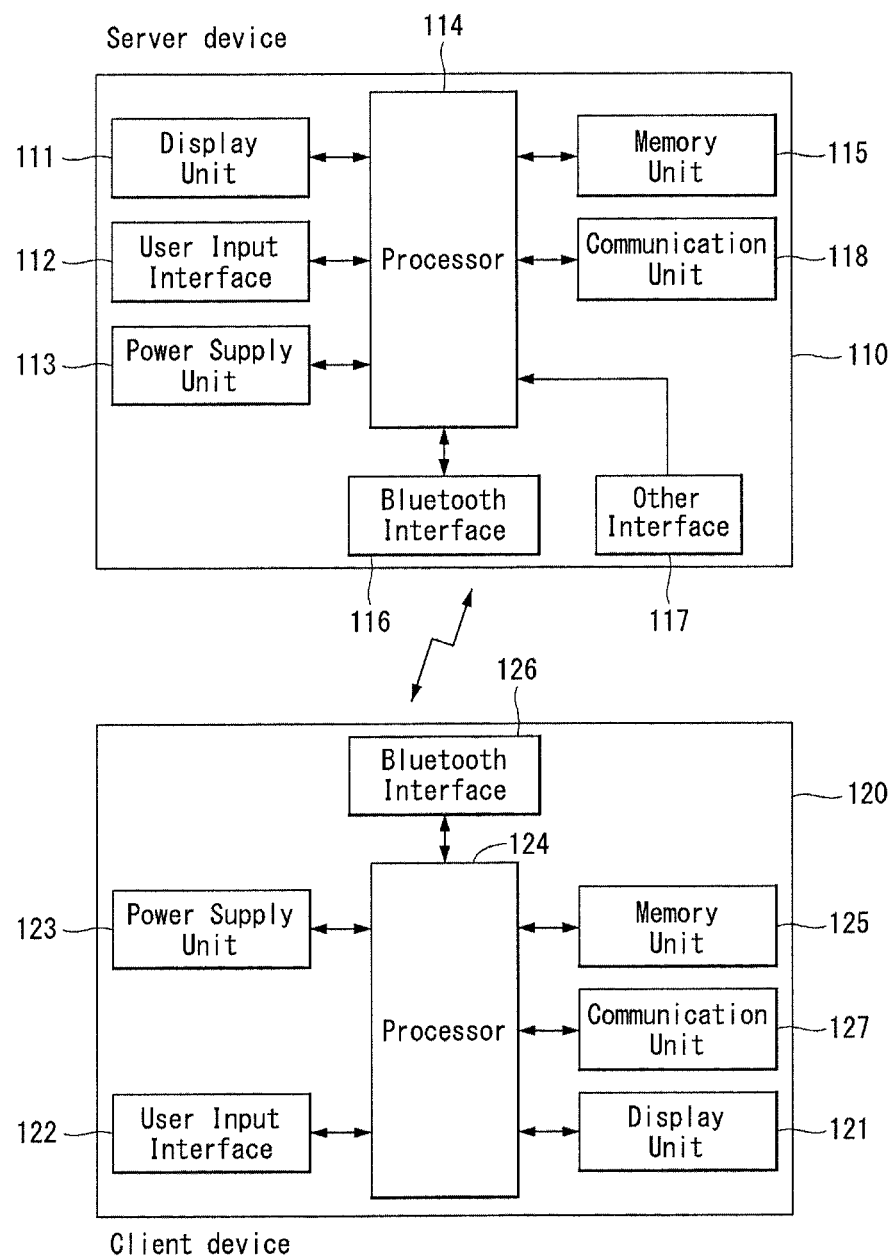
FIG. 2 shows an example of an internal block diagram of a device to which the present invention may be applied.

FIG. 2 shows an example of an internal block diagram of a device to which the present invention may be applied.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117 and the communication unit 118 are functionally connected to perform a method proposed in this disclosure.

Furthermore, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127 and the communication unit 128 are functionally connected and perform methods proposed in the present invention.

The Bluetooth interface 116, 126 refers to a unit (or module) capable of transmitting data, such as a request/response, a command, a notification, an indication/confirmation message, between devices.

The memory unit 115, 126 is a unit implemented in various types of devices in which various types of data are stored.

The processor 114, 124 refers to a module controlling an overall operation of the server device or the client device, which controls requesting the transmission of a message through the Bluetooth interface and other interface and processing a received message.

The processor 114, 124 may also be called a controller, a control unit or the like.

The processor 114, 124 may include application-specific integrated circuits (ASICs), other chip sets, logic circuits and/or data processing units.

The processor 114, 124 controls the communication units so that they receive an advertising message from the server device, controls the communication unit so that it transmits a scan request message to the server device and receives a scan response message from the server device in response to the scan request, and controls the communication unit so that it transmits a connection request message to the server device in order to establish a Bluetooth connection with the server device.

Furthermore, after a Bluetooth LE connection is established through a connection procedure, the processor 114, 124 controls the communication units so that they read or write data using an attribute protocol from the server device The memory unit 115, 125 may include read-only memory (ROM), random access memory (RAM), flash memory, a memory card, a storage medium and/or other storage devices.

The communication unit 118, 127 may include a baseband circuit for processing a wireless signal. If an embodiment is implemented in software, the aforementioned technology may be implemented as a module (process, function, etc.) performing the aforementioned function. The module may be stored in the memory unit and executed by the processor.

The memory unit 115, 125 may be present inside or outside the processor 114, 124 and may be connected to the processor 114, 124 through various well-known units.

The display unit 111, 121 refers to a module providing status information of the device, message exchange information and the like to a user through a screen.

The power supply unit 113, 123 refers to a module receiving external power or internal power and supplying power necessary for the operations of the components under the control of the controller 114, 124.

As mentioned above, the BLE technology has a relatively small duty cycle and significantly reduce power consumption through a low data rate.

The input unit 112, 122 refers to a module providing a user input to a controller, like a screen button, to allow the user to control an operation of a device.

Figure 3:
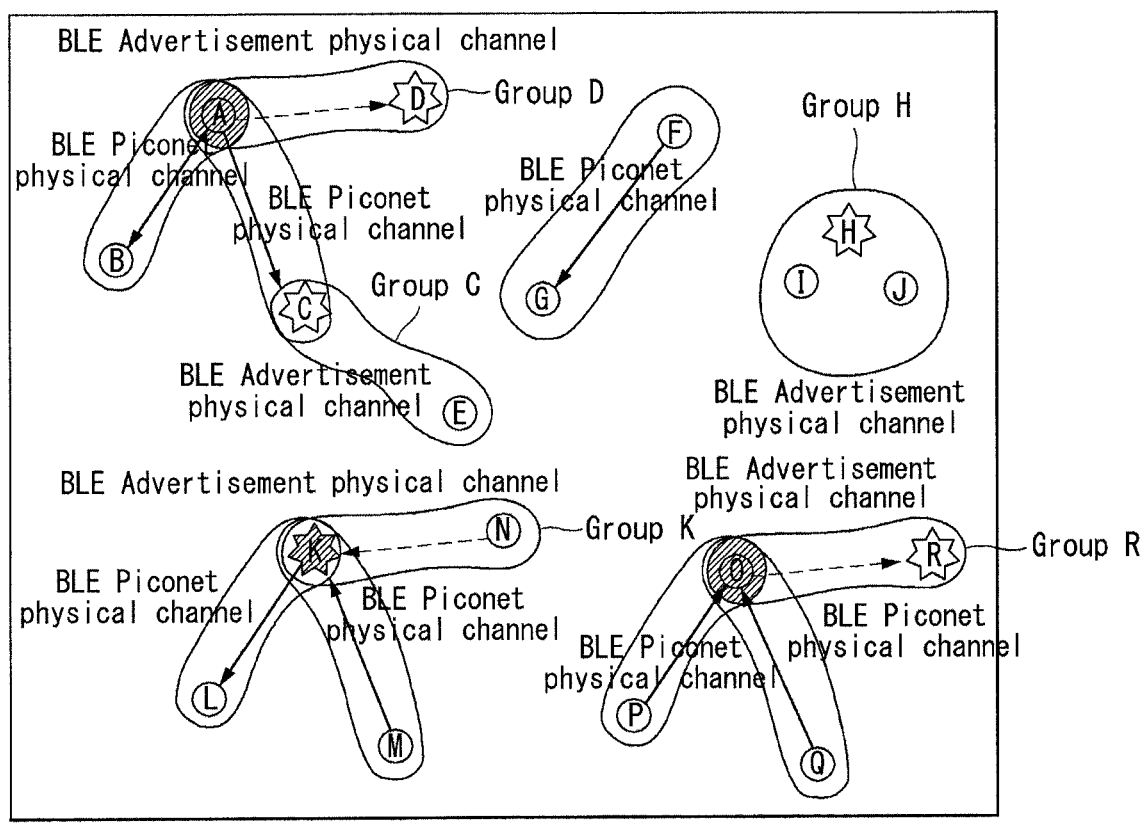
FIG. 3 shows an example of Bluetooth LE topology.

FIG. 3 is a view illustrating an example of the BLE topology.

Referring to FIG. 3, a device A corresponds to a master in a piconet (piconet A, the shaded portion) having a device B and a device C as slaves.

In this case, the piconet refers to an aggregation of devices in which any one of them is a mater and the other devices occupy a shared physical channel connected to the master device.

The BLE slaves do not share a common physical channel with the master. Each of the slaves communicates with the master trough a separate physical channel. There is another piconet (piconet F) having a master device F and a slave device G.

A device K is present in a scatternet K. In this case, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 3, five different device groups are present.

1. Device D is an advertiser and device A is an initiator (group D).

2. Device E is a scanner and Device C is an advertiser (group C).

3. Device H is an advertiser, and devices I and J are scanners (group H).

4. Device K is also an advertiser, and device N is an initiator (group K).

5. Device R is an advertiser, and device O is an initiator (group R).

The devices A and B use a single BLE piconet physical channel.

The devices A and C use another BLE piconet physical channel.

In group D, the device D advertises using an advertising event connectable in an advertising physical channel, and the device A is an initiator. The device A may establish a connection with the device D and add a device to the piconet A.

In group C, the device C advertises on an advertising physical channel using a certain type of an advertising event captured by the scanner device E.

The group D and the group C may use different advertising physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertising physical channel. The device H is an advertiser, and the devices I and J are scanners.

In the scatternet K, the devices K and L use a single BLE piconet physical channel. The devices K and M use another BLE piconet physical channel.

In group K, the device K advertises using an advertising event connectable on an advertising physical channel, and the device N is an initiator. The device N may establish a connection with the device K. In this case, the device K may be a slave of two devices and a master of one device at the same time.

In the scatternet O, the devices O and P use a single BLE piconet physical channel. The devices O and Q use another BLE piconet physical channel.

In group R, the device R advertises using an advertising event connectable on an advertising physical channel, and the device O is an initiator. The device O may establish a connection with the device R. In this case, the device O may be a slave of two devices and a master of one device at the same time.

Figure 4:
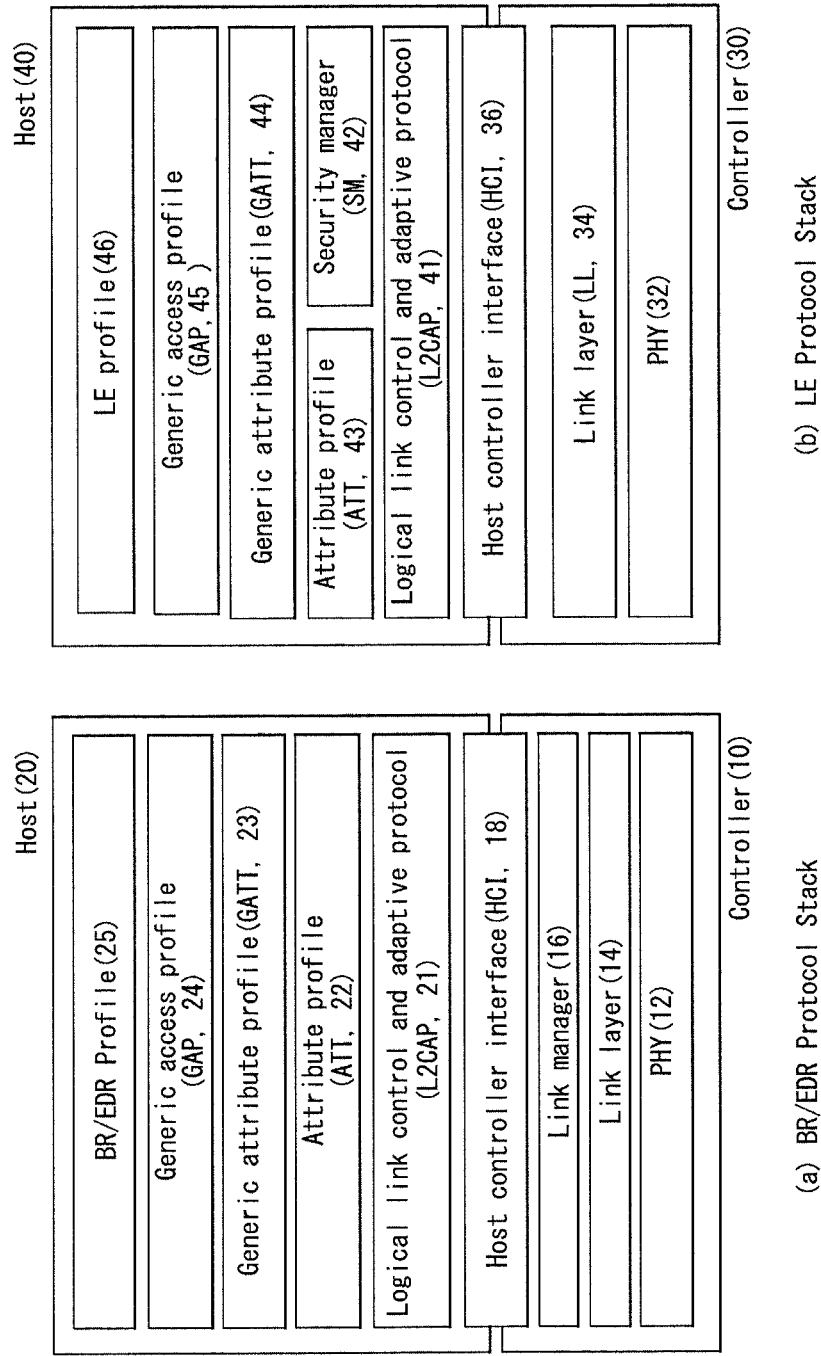
FIG. 4 is a diagram showing an example of Bluetooth communication architecture to which the present invention may be applied.

FIG. 4 is a diagram showing an example of Bluetooth communication architecture to which the present invention may be applied.

Referring to FIG. 4, (a) of FIG. 4 illustrates an example of a protocol stack of a Bluetooth basic rate (BR)/enhanced data rate (EDR), and (b) of FIG. 4 illustrates an example of a protocol stack of BLE.

In detail, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 20 may include a BR/EDR PHY layer 12, a BR/EDR baseband layer 14, and a link manager 16.

The BR/EDR PHY layer 12 is a layer transmitting and receiving a 2.4 GHz wireless signal. If Gaussian frequency shift keying (GFSK) modulation is used, the BR/EDR PHY layer 12 may transmit data by hopping 79 RF channels.

The BR/EDR baseband layer 14 functions to transmit a digital signal, select a channel sequence hopping 1400 times per second, and transmit a time slot having a length of 625 us for each channel.

The link manager layer 16 controls an overall operation (link setup, control and security) of a Bluetooth connection using a link manager protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs a security (authentication, pairing and encryption) function.

The host controller interface layer 18 provides an interface between the host module and the controller module to allow the host to provide a command and data to the controller and allow the controller to provide an event and data to the host.

The host stack (or host module 20) includes a logical link control and adaptation protocol (L2CAP) 21, a security manager (SM) 22, an attribute protocol (ATT) 23, a generic attribute profile (GATT) 24, a generic access profile (GAP) 25, and a BR/EDR profile 26.

The logical link control and adaptive protocol (L2CAP) 21 may provide a two-way channel for transmitting data to a specific protocol or a profile.

The L2CAP 21 may multiplex various protocols and profiles provided by a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 24 may operate as a protocol describing how the attribute protocol 23 is used when services are configured. For example, the generic attribute profile 24 may operate to define how the ATT attributes are grouped with services, and operate to describe features associated with the services.

Thus, the GATT 24 and the ATT 23 may use features in order to describe the status and services of a device and describe how the features are related and used.

The attribute protocol (ATT) 23 and profile 26 define a service (profile) using the Bluetooth BR/EDR and define an application protocol for exchanging data thereof, and the generic access profile (GAP) 25 defines a scheme for discovering and connecting devices and providing information to a user, and provides privacy.

As illustrated in (b) of FIG. 4, the Bluetooth LE protocol stack includes a controller stack 30 operable to process a wireless device interface whose timing is important, and a host stack 40 operable to process high level data.

First, the controller stack 30 may be implemented using a communication module that may include a Bluetooth wireless device, for example, a processor module that may include a processing device, such as a microprocessor.

The host stack may be implemented as part of an OS that operates on a processor module or may be implemented as the instantiation of a package on the OS.

In some examples, the controller stack and the host stack may operate or may be executed on the same processing device within a processor module.

The controller stack 30 includes a physical layer (PHY) 32, a link layer (LL) 34, and a host controller interface (HCI) 36.

The physical layer (PHY) (wireless transceiver module) 32 is a layer for transmitting and receiving a 2.4 GHz wireless signal, and uses Gaussian frequency shift keying (GFSK) modulation and a frequency hopping technique including 40 RF channels.

The link layer (LL) 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include a generic access profile (GAP) 40, a logical link control and adaptation protocol (L2CAP) 41, a security manager (SM) 42, an attribute protocol (ATT) 43, a generic attribute profile (GATT) 44, a generic attribute profile (GAP) 45, and an LE profile 46. However, the host stack 40 is not limited thereto and may include various protocols and profiles.

The host stack multiplexes various protocols and profiles provided from a Bluetooth higher position using the L2CAP.

First, the L2CAP 41 may provide a single two-way channel for transmitting data to a specific protocol or profile.

The L2CAP 41 may operate to multiplex data between higher layer protocols, segment and reassemble packages, and to manage the transmission of multicast data.

In Bluetooth LE, three fixed channels (one for signaling CH, one for a security manager, and one for an attribute protocol) are basically used. Also, a dynamic channel may also be used as necessary.

Meanwhile, in a basic rate/enhanced data rate (BR/EDR), a dynamic channel is basically used and a protocol service multiplexer, retransmission, a streaming mode, and the like, are supported.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

Request and Response message: a request message is a message for a client device to request specific information from a server device, and a response message, as a response message with respect to the request message, refers to a message transmitted from the server device to the client device.

Command message: a message transmitted from the client device to the server device in order to indicate a command of a specific operation. The server device does not transmit a response with respect to the command message to the client device.

Notification message: a message transmitted from the server device to the client device in order to provide notification of an event or the like. The client device does not transmit a confirmation message with respect to the notification message to the server device.

Indication and confirmation message: a message transmitted from the server device to the client device in order to provide notification of an event or the like. Unlike the notification message, the client device transmits a confirmation message regarding the indication message to the server device.

In the present invention, when the GATT profile using the attribute protocol (ATT) 43 requests long data, a value regarding a data length is transmitted to allow a client to clearly know the data length, and a characteristic value may be received from a server using a universal unique identifier (UUID).

The generic access profile (GAP) 45, a layer newly implemented for the Bluetooth LE technology, is used to select a role for communication between Bluetooth LED devices and to control how a multi-profile operation takes place.

Furthermore, the generic access profile (GAP) 45 is mainly used for device discovery, connection generation, and security procedure part, defines a scheme for providing information to a user, and defines types of attributes as follows.

Service: It defines a basic operation of a device by a combination of behaviors related to data
Include: It defines a relationship between services
Characteristics: It is a data value used in a server
Behavior: It is a format that may be read by a computer defined by a UUID (value type).

The LE profile 46, profiles dependent upon GATT, is mainly applied to a BLE device. The LE profile 46 may include, for example, Battery, Time, FindMe, Proximity, Time, Object Delivery Service, and the like, and details of GATT-based Profiles are as follows.

Battery: Battery information exchanging method
Time: Time information exchanging method
FindMe: Provision of alarm service according to distance
Proximity: Battery information exchanging method
Time: Time information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

In this case, the advertising device refers to a device that transmits an advertising event, that is, a device that performs an advertisement, and it is also called an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request Advertising Procedure The advertising device performs an advertizing procedure to perform undirected broadcast to devices within a region.

In this case, omni-directional broadcast refers to broadcast in all (every) directions, rather than broadcast in a specific direction.

In contrast, directional broadcast refers to broadcast in a specific direction. Omni-directional broadcast is generated between an advertising device and a device in the listening state (hereinafter, referred to as a "listening device").

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisings (or advertising events) are broadcast through an advertising physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertising device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

In order to request additional user data from the advertising device, the scanning device transmits a scan request to the advertising device. The advertising device transmits a scan response, including additional user data requested by the scanning device, through an advertising physical channel in response to the scan request.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode Discovering Procedure Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier Scanning State The LL enters the scanning state according to an instruction from the host (stack). In the scanning state, the LL listens to advertising channel indices.

The scanning state includes two types: passive scanning and active scanning. Each of the scanning types is determined by the host.

A separate time or advertising channel index for performing scanning is not defined.

In the scanning state, the LL listens to an advertising channel index for scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device Initiating State The LL enters the initiating state according to an instruction from the host (stack).

When the LL is in the initiating state, the LL performs listening on advertising channel indices.

During the initiating state, the LL listens to an advertising channel index during the scan window interval Connection State When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in a Bluetooth interface will be briefly described. BLE devices use packets defined as follows Packet Format The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state Scanning PDU The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

Figure 5:
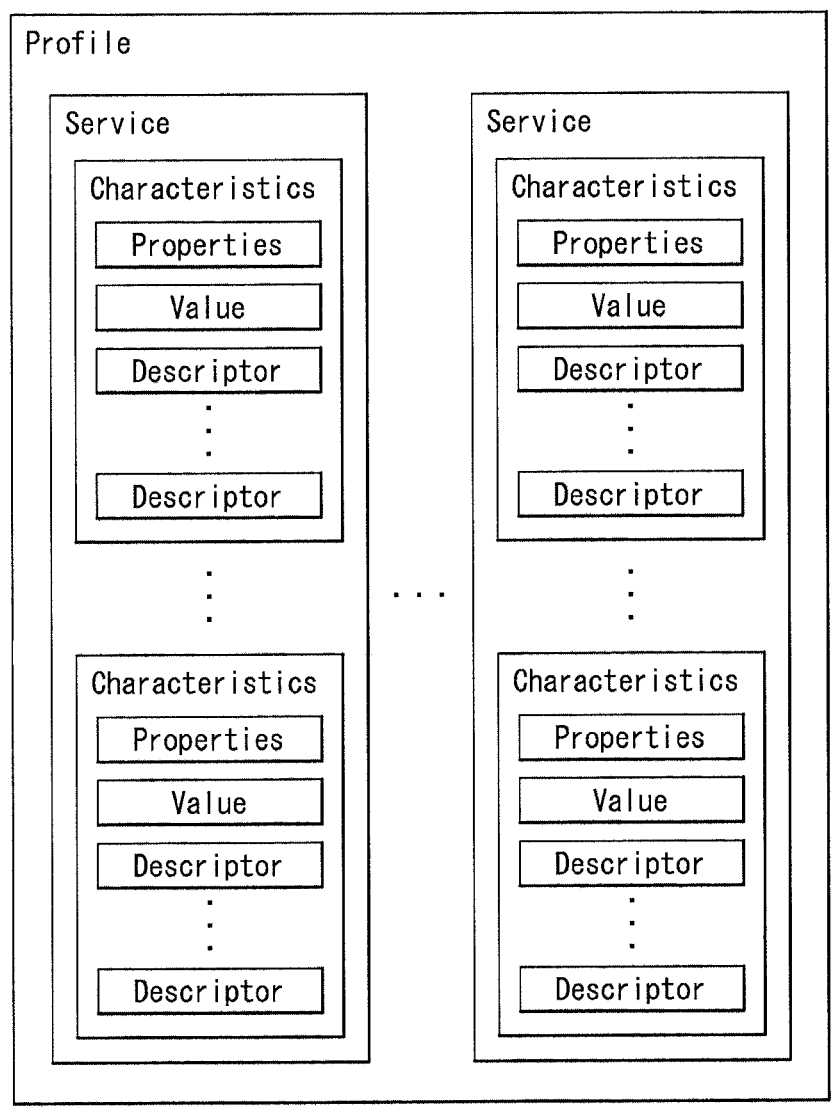
FIG. 5 is a diagram showing an example of the structure of a profile based on the generic attribute profile (GATT) of Bluetooth LE.

FIG. 5 is a diagram showing an example of the structure of a profile based on the generic attribute profile (GATT) of Bluetooth LE.

Referring to FIG. 5, a structure for exchanging profile data of BLE may be examined.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service functions to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each piece of information, an attribute may be required for each piece of information. The characteristic may use several continuous attributes.

The attribute has four components and has meanings as follows.

handle: Address of attribute
Type: Type of attribute
Value: Value of attribute
Permission: Right to access attribute FIG. 6 is a flow chart illustrating a method for forming a connection using Bluetooth low energy (BLE) between devices.

Figure 6:
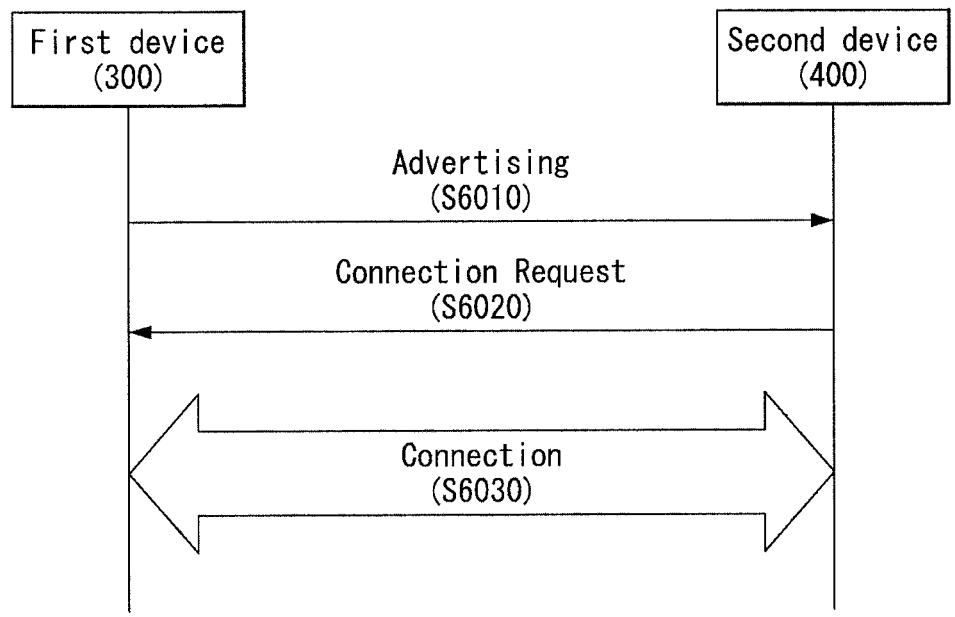
FIG. 6 is a flow chart illustrating a method for forming a connection using a Bluetooth low energy (BLE) between devices.

As illustrated in FIG. 6, for a BLE connection between a first device 200 and a second device 300, the first device 200 transmits an advertising message to the second device 300 (S6010)>

As described above, the advertising message is used for a device to provide information thereof to another device by utilizing BLU and may include various types of information such as service information, user information, and the like, provided by the device.

The second device 300 checks information included in the advertising message transmitted from the first device 200 and transmits a connection request message for requesting BLE connection to the first device 200 (S6020).

Thereafter, the first device 200 and the second device 300 forms a BLE connection through an authentication procedure, a security procedure, and the like, of the devices (S6030).

In Bluetooth LE, however, link quality is variable in terms of characteristics of wireless transmission, and thus, a shadow area exceeding a radio propagation distance may be generated in view of one-to-one connection characteristics. Thus, in order to solve the problem, in Bluetooth, a mesh network may be formed by devices equipped with Bluetooth as a scheme for controlling through a multi-hop connection between several devices.

Hereinafter, a mesh network will be described.

Figure 7:
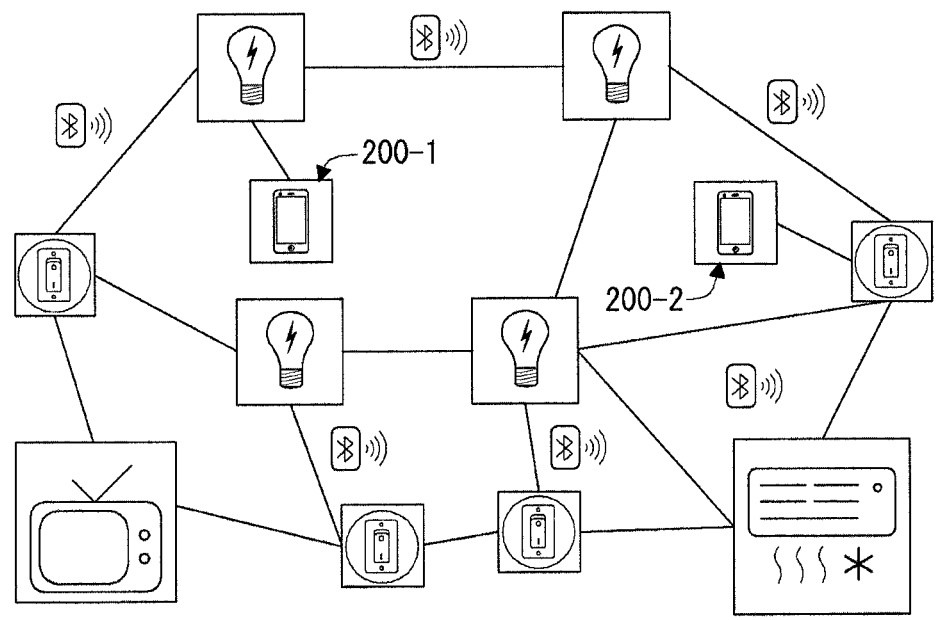
FIG. 7 is a schematic diagram showing an example of a Bluetooth mesh network to which the present invention may be applied.

FIG. 7 is a schematic diagram illustrating an example of a Bluetooth mesh network to which the present invention may be applied.

As illustrated in FIG. 7, a mesh network refers to a network in which multiple devices are connected like a mesh through Bluetooth to transmit and receive data.

A Bluetooth mesh network technology is provided with a first device 200 as a source device transmitting data, a second device 300 as a destination device 200-2 receiving data, and several relay nodes relaying a message midway between the source device and the destination device.

Or, edge nodes 200 and 300 and relay nodes may be differentiated.

Each node includes a message cache of a recently received message. If a received message is already present in a message cache, the message is not relayed.

However, the received message is not present in the message cache, the message is relayed and stored in the message cache.

The edge node, which is generally provided with electric power through a battery, may usually be present in a sleep state and may interact or periodically be awaken.

The edge node may process a received message when the following conditions are met.

A message is not present in a message cache.
A message is authenticated by a known network key.
A destination of a message is a unicast address of the edge
  nodes or a broadcast address or a group address is an
  address of a place to which the edge nodes belong.

The relay node, a device generally provided with main power, may always be awake and transmit received data for other nodes The relay node may re-transmit received message to another node when the following conditions are met.

A message is not present in a message cache.
A message is authenticated by a known network key.
A field (e.g., a relay number value) indicating whether to
  relay a message has a value permitting relay.
A destination address is not a unicast address allocated to
  the relay node.

In the Bluetooth mesh network, a flooding scheme and a routing scheme may be differentiated depending on a data transmission scheme of relay nodes.

In the routing scheme, the source device 200 transmits a message to a specific relay node, and the specific relay node, which has received the message, transmits the message with information of another relay node or the destination node 300 to which the message is to be re-transmitted.

In order to receive and re-transmit the message, the routing scheme uses a broadcasting channel or a point-to-point connection scheme.

Also, a routing device which receives a message in the routing scheme determines the best routing route(s) for transmitting the message to an intermediate device or a destination device, and determines to which route the message is to be transmitted on the basis of a determined routing table.

However, in the routing scheme, since messages should be transmitted, while maintaining the routing tables, an increase in messages increases complexity, requires more memories, is less dynamic compared with the flooding scheme, and is difficult to implement, but is advantageous in that it has good expandability.

The flooding scheme refers to a scheme in which relay nodes receiving a message discharges the message in the air using characteristics that radio propagation is spread in every direction in the air.

That is, the source device 200 transmits a message to the relay nodes through broadcast channels, and the relay nodes, which have received the message, transmit the received message to adjacent relay nodes to transmit the message to the destination device 300.

In the flooding scheme, a broadcasting channel is used to receive and re-transmit a message, and a message transmission range may be extended.

A mesh network based on the flooding scheme is a dynamic network. In the flooding-based mesh network, a device may receive and transmit (or re-transmit) a message satisfying density of the device.

The flooding scheme is advantageous in that is can be easily implemented, but as a network expands, expandability may be problematic because messages are transmitted without directionality.

That is, in the flooding-based mesh network, when a device transmits a message, multiple devices receive the message and transmit the received message to other multiple devices.

In order to prevent this, the number of devices forming a mesh network may be adjusted to a range from 100 to 1000 and an accurate number of devices may be determined by various factors.

For example, the number of devices may be determined according to network capacity, traffic load of data sources, latency of a network, reliability requirements, and the like.

Also, unlike the routing scheme, the flooding scheme can easily transmit a message without incurring cost for establishing a routing table but has shortcomings of increasing network traffic due to characteristics that all the relay devices which have received the message re-transmit the received message.

In the Bluetooth mesh network, when a new device wants to join the mesh network, the new device cannot know whether a mesh network is present therearound, and when a message is intended to be transmitted to a destination device, an address of the destination device cannot be accurately known.

Also, there is no way to determine whether a message transmitted to a destination device has been properly transmitted.

Thus, in order to solve the problems, the present invention defines a new message type for a new device to identify a mesh network and proposes a method for setting and transmitting an address of a destination device and a method for receiving a response with respect to a transmitted message.

Figure 8:
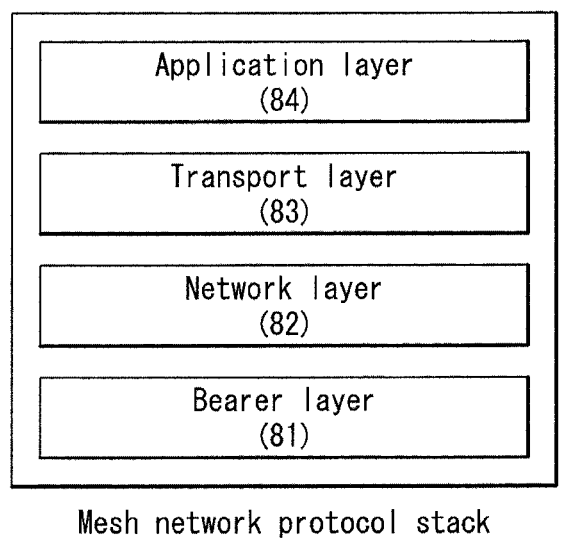
FIG. 8 is a diagram showing an example of the protocol stack of a Bluetooth mesh network to which the present invention may be applied.

FIG. 8 is a diagram showing an example of the protocol stack of a Bluetooth mesh network to which the present invention may be applied.

Referring to FIG. 8, the protocol stack of the mesh network includes a bearer layer 81, a network layer 82, a transport layer 83 and an application layer 84.

The bearer layer 81 defines a method in which a message is transmitted between nodes. That is, in a mesh network, the bearer layer determines a bearer to which a message is transmitted.

A mesh network includes an advertising bearer and a GATT bearer for message transmission.

The network layer 82 defines a method of a message being transmitted to one or more nodes in a mesh network and the formats of network messages transmitted by the bearer layer 81.

Furthermore, the network layer 82 defines whether a message will be relayed or forwarded and a method of authenticating and encrypting network messages.

The transport layer 83 defines the encryption and authentication of application data by providing the confidentiality of an application message.

The application layer 84 defines a method and application Opcode and parameters relating how a higher layer application uses the transport layer 83.

Figure 9:
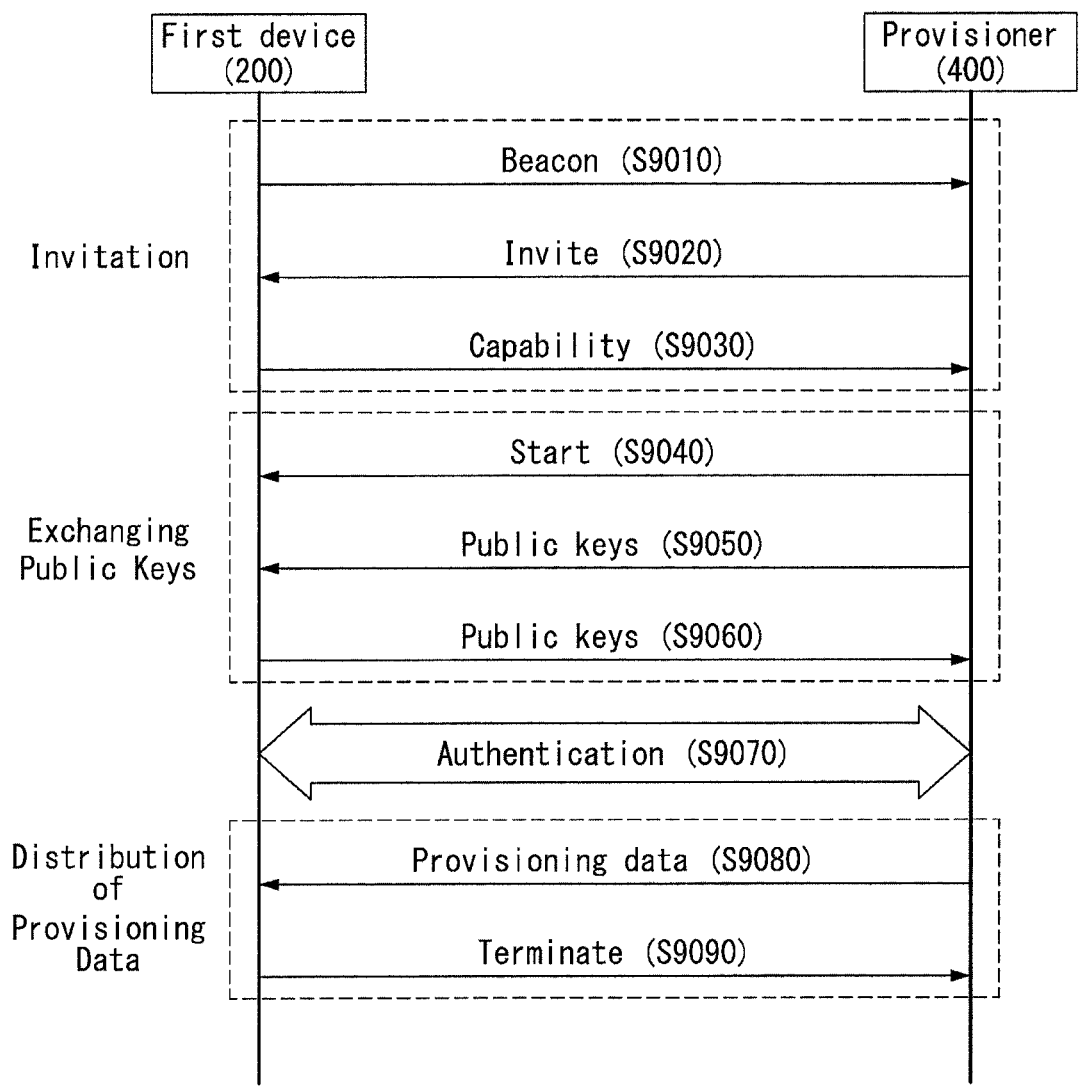
FIG. 9 is a flowchart illustrating an example of a method for a device to join a Bluetooth mesh network, to which the present invention may be applied.

FIG. 9 is a flowchart illustrating an example of a method for a device to join a Bluetooth mesh network, to which the present invention may be applied.

In order for a new device or a non-provisioned device to join a mesh network, the device should undergo a provisioning procedure.

The provisioning procedure refers to a procedure for authenticating a non-authenticated device and providing basic information (e.g., a unicast address, various keys, etc.) for joining the mesh network.

That is, the provisioning procedure is a procedure for providing information for a provisioner 400 of the mesh network to join the mesh network, and through the provisioning procedure, the first device 100 may obtain an address of the network, keys, a device identifier, and various types of information to operate as part of the mesh network.

The provisioning procedure includes an invitation step, a public key exchanging step, an authentication step, and a provisioning data distribution step.

The provisioning procedure may be performed through various types of bearer. For example, the provisioning procedure may be performed by an advertising-based bearer, a mesh provisioning service-based bearer, or a mesh-based bearer.

The advertising-based bearer is an essentially established bearer. In case where the advertising-based bearer is not supported or in case where provisioning data cannot be transmitted through the advertising-based bearer, the provisioning service-based bearer or the mesh-based bearer may be used in the provisioning procedure.

The provisioning service-based bearer refers to a bearer for exchanging provisioning data through a GATT protocol of an existing Bluetooth LE, and the mesh-based bearer refers to a bearer exchanging provisioning data through the mesh network when the first device and the provisioner are not present within a distance for directly exchanging data.

A procedure for establishing the advertising-based bearer will be described hereinafter.

After the bearer is established between the first device 200 and the provisioner 400, the first device 200 may be provisioned through the following provisioning procedure.

Invitation Step

The invitation step starts as the provisioner 400 scans the first device 200. The first device 200 transmits a beacon message to the provisioner 400 (S9010). The beacon message includes a UUID of the first device 200.

Through the beacon message, the provisioner 400 which has scanned the first device 200 transmits an invite message to the first device 200 (S9020).

The invite message inquires about whether the first device 200 wants to perform a provisioning procedure, and when the first device 200 does not want to perform the provisioning procedure, the first device 200 disregards the invite message.

However, when the first device 200 wants to perform the provisioning procedure, that is, when the first device 300 wants to join the mesh network, the first device 200 transmits a capability message as a response (S9030).

The capability message includes information indicating whether the first device 200 supports setting of a security algorithm, a public key, information indicating whether a value can be output to a user, information indicating whether a value can be received from the user, and the like.

Public Key Exchanging Step

Thereafter, the provisioner 400 transmits a starting message for starting provisioning to the first device 200 (S9040).

In case where a public key cannot be used due to the use of an out-of-band technology, the provisioner 400 and the first device 200 exchange public keys (S9050, S9060).

However, in case where a public key can be used through an out-of-band mechanism, the provisioner 400 may transmit an ephemeral public key to the first device 200 and read a static public key from the first device 200 using an out-of-band technology.

Thereafter, the provisioner 400 performs an authentication procedure with the first device 200 to authenticate the first device 200 (S9070).

Provisioning Data Distribution Step

When the first device 200 is authenticated, the provisioner 400 and the first device 200 calculate and generate a session key.

Thereafter, the provisioner 400 transmits provisioning data to the first device 200 (S9080).

The provisioning data may include an application key, a device key, a network key, an IVindex, a unicast address, and the like.

When the first device 200 receives the provisioning data, the first device 200 transmits a complete message as a response, and the provisioning procedure is terminated (S9090).

Figure 10:
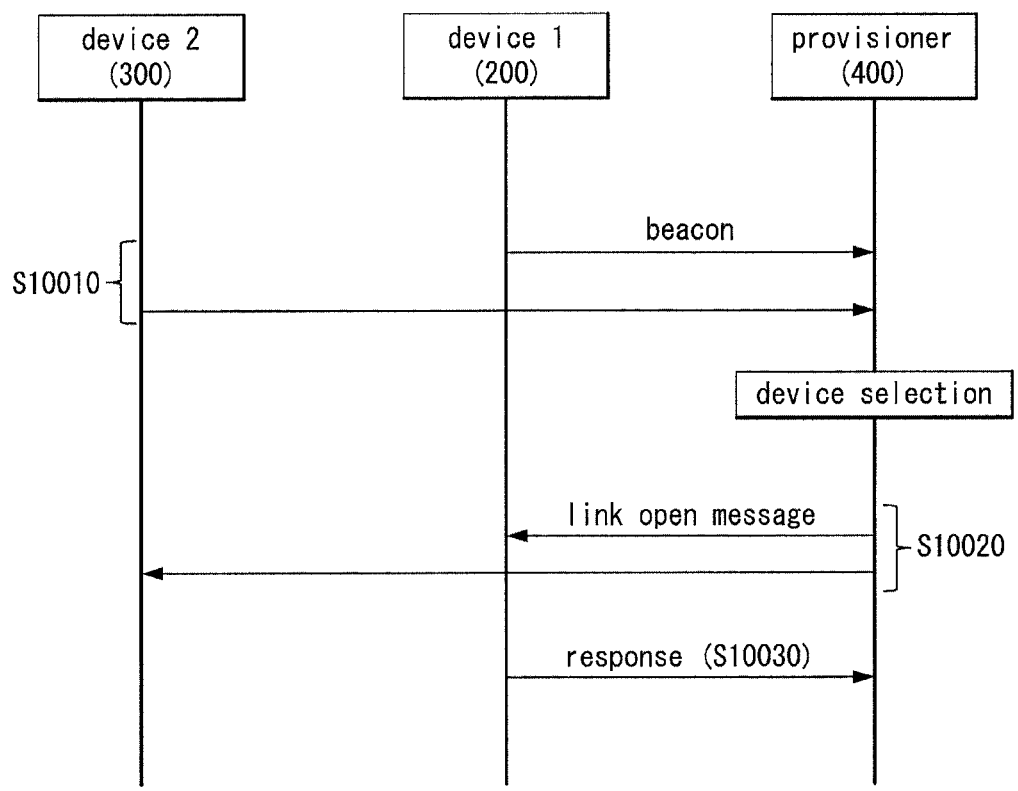
FIG. 10 is a flow chart illustrating an example of a procedure for establishing an advertising-based bearer to which the present invention may be applied.

FIG. 10 is a flow chart illustrating an example of a procedure for establishing an advertising-based bearer to which the present invention may be applied.

Referring to FIG. 10, before performing a provisioning procedure with a new device (first device 200), the provisioner may establish the advertising-based bearer described above with reference to FIG. 8.

In detail, the advertising-based bearer (hereinafter, referred to as a "link") is established between the provisioner and the first device to transmit and receive messages of the provisioning procedure.

First, the first device 200 and the second device 300, which have not been provisioned, transmit a beacon message to the provisioner 400 (S10010).

Here, the beacon message may be transmitted to neighboring devices including the provisioner 400 in a broadcast manner, and may include a universal unique identifier (UUID).

The provisioner 400 may receive the beacon messages and identify the devices which have transmitted the beacon message through the UUID included in the beacon message.

The provisioner may select the first device 200 as a device for performing a provisioning procedure on the basis of a received signal strength indicator (RSSI), and the like, among the identified devices.

Thereafter, the provisioner may transmit a link open message including the UUID of the selected first device 200 and an ID of an established link to the first device 200 and the second device 300 (S10020).

Here, the link open message may be transmitted to neighboring devices in a broadcast manner.

Upon receiving the link open message, the first device 200 may know that the provision wants to form a link with the first device 200 through the UUID included in the link open message, and may transmit a response message including an ID of the link to the provisioner 400, as a response (S10030).

Through this procedure, a link may be formed between the provisioner 400 and the first device 200, and the provisioning procedure described above with reference to FIG. 8 may be performed through the established link.

Figure 11:
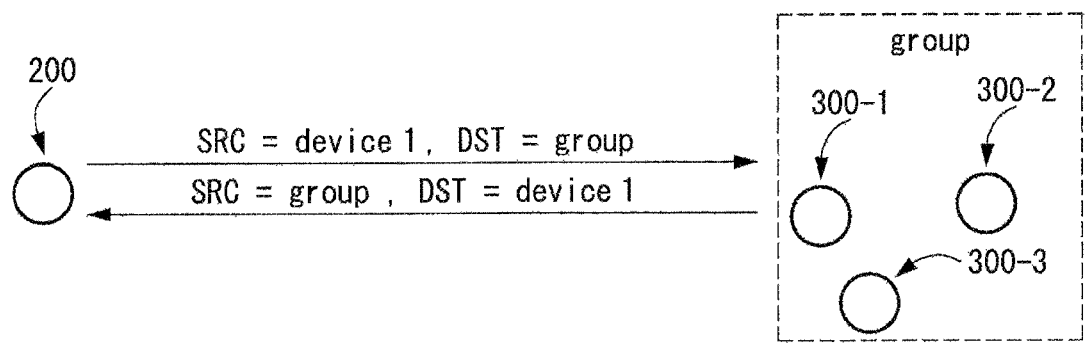
FIGS. 11 and 12 illustrate an example of a method for transmitting/receiving data in a Bluetooth mesh network, to which the present invention may be applied.
Figure 11:
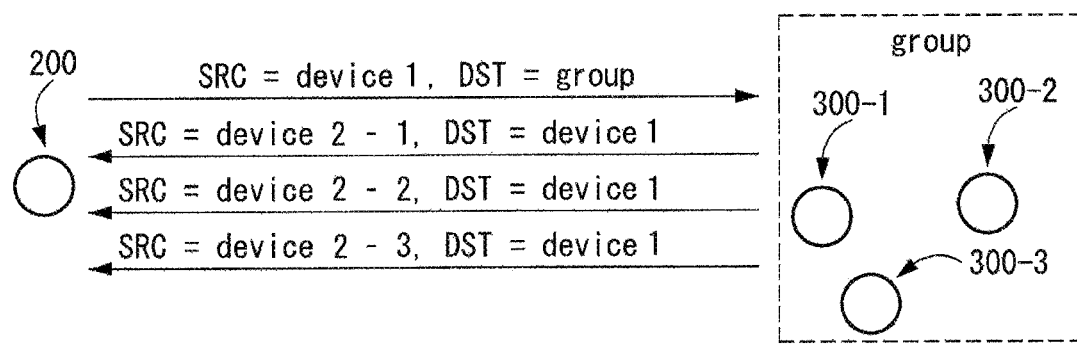
Figure 12:
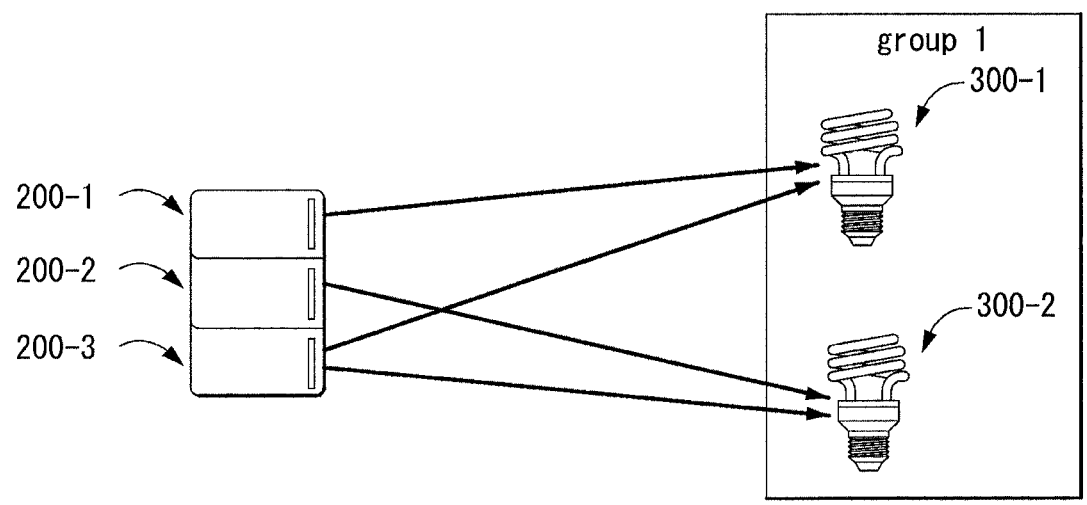

FIGS. 11 and 12 illustrate an example of a method for transmitting/receiving data in a Bluetooth mesh network, to which the present invention may be applied.

Referring to FIGS. 11 and 12, when a device included in a Bluetooth mesh network transmits a message to a device or a group of devices within the mesh network, the device may transmit the message including an address of a transmission device and an address of a reception device.

In FIG. 11, device 1 200, device 2-1 300-1, device 2-2 300-2, and device 2-3 300-3 form a mesh network, and the device 2-1 300-1, the device 2-2 300-2, and the device 2-3 300-3 form a group.

In case where the first device 200 transmits a specific message to the devices forming the group, the first device 200 may set a destination address of the specific message, as a group address, and transmit the specific message.

The specific message may be received by the devices forming the group, and the group may transmit a response with respect to the specific message to the first device 200.

Here, addresses of the device to be used in the mesh network may be allocated through the provisioning procedure discussed above with reference to FIG. 9. That is, each device may perform the provisioning procedure to join the Bluetooth mesh network and may be allocated an address to be used in the mesh network through the provisioning procedure.

An address of the source device of the response may be set by the following two methods.

First, as illustrated in (a) of FIG. 11, in case where the device transmits a message to a specific group, the specific group may transmit a response message in which an address field of a source device is set to an address of the specific group to the first device 200, in response thereto.

That is, after allocating a group address indicating the group formed by the devices, the device 1 200 may include an address of the device 1 200 in an SRC field indicating an address of a source device and include an address of the allocated group in a DST field indicating an address of a destination device, when transmitting the message to the group.

Here, in case where a response with respect to the message is required, for example, in case where a specific field included in the message indicates a request for a response, the group may include the address of the group in the SRC field and the address of the device 1 200 in the DST field, when transmitting a response message to the device 1 200.

Second, as illustrated in (b) of FIG. 11, in case where the device transmits a message to a specific group, the specific group may transmit a response message in which an address field of a source device is set as an address of a device transmitting a response message, to the first device 200, as a response thereto.

That is, the device 1 200 includes an address of the device 1 200 in the SRC field indicating an address of a source device as a device transmitting the message and an address of the group in the DST field indicating an address of a destination device as a device receiving the message, when transmitting the message to the group.

Here, in case where a response with respect to the message is required, for example, in case where a specific field included in the message indicates a request for a response, each device of the group includes a device address of their own in the SRC field and an address of the device 1 200 in the DST field and transmits a response message, unlike the case of (a) of FIG. 11.

FIG. 12 illustrates an example of a method for a switch to transmit a message for ON/OFF to each electric bulb, as an embodiment of the method described above with reference to FIG. 11.

Hereinafter, in this embodiment, for the purposes of description, a switch and an electric bulb are described as an example, but the present invention may also be applied various devices, as well as to the switch and the electric bulb.

In FIG. 12, switch 1 200-1, switch 2 200-2, switch 3 200-3, electric bulb 1 300-1, and electric bulb 2 300-2 form a Bluetooth mesh network, and the electric bulb 1 300-1 and the electric bulb 2 300-2 are included in group 1.

It is assumed that each switch knows each electric bulb and an address of the group formed by the electric bulbs.

In each of the switches and electric bulbs, an SRC indicating an address of a device transmitting a message and a DST indicating an address of a destination device for transmitting a message are set, and the switches and electric bulbs may transmit a message according to the set DST.

That is, as illustrated in FIG. 12, in case where an address of the switch 1 200-1 is set in the SRC and an address of the electric bulb 1 300-1 is set in the DST, the switch 1 200-1 may transmit a message to the electric bulb 1 300-1.

Similarly, in case where an address of the switch 2 200-2 is set in the SRC and an address of the electric bulb 2 300-2 is set in the DST, the switch 2 200-2 may transmit a message to the electric bulb 2 300-2.

In the case of switch 3 200-3, an address of the switch 3 200-3 is set in the SRC and an address of the group 1 is set in the DST. Thus, when the switch 3 200-3 transmits a message, the message may be transmitted to both the electric bulb 1 300-1 and the electric bulb 2 300-2.

In order to set the SRC and the DST, two methods may be provided as follows.

First, the SRC and the DST may be set through a Bluetooth GATT database.

In detail, the switches and electric bulbs have SRC characteristics indicating an address of a source device and DST characteristics indicating an address of a destination device in the GATT database.

When an address of a specific device is written in the SRC characteristics and the DST characteristics through a write request message and a write response message, the message in which the address written in the SRC is used as an address of a source device and the address written in the DST is used as an address of a destination device may be transmitted.

Here, an address of a group may be set in the SRC characteristics and the DST characteristics. However, in case where it is possible to set addresses of devices in the DST characteristics, the address of the group may not be used.

In order to set an address of the specific device in the SRC characteristics and the DST characteristics, a message (first message) requesting writing of the SRC characteristics and the DST characteristics may be transmitted or a motion of writing an address of the specific device in the SRC characteristics and the DST characteristics may be indicated through control point characteristics.

Here, in order to set the SRC and DST through the GATT database or the GATT protocol, a device should form a Bluetooth LE (BLE) connection through the procedure described above with reference to FIG. 6.

Second, the SRC and the DST may be set through a setting message.

In detail, an address of a specific device may be set in the SRC and the DST by transmitting a message for setting an address of a source device, an address of a destination device, and an address of a group in the mesh network.

Here, a control device transmitting the setting message should already know an address of a device to be set in advance, and the setting message for setting the SRC may be selectively used.

In this manner, according to the present invention, a plurality of addresses may be allocated to one device. For example, in case where devices form a group, the devices may be allocated a unique address to be used in the mesh network and an address of the formed group.

For example, in FIG. 12, the electric bulb 1 300-1 and the electric bulb 2 300-2 may be allocated a unique address allocated to each device and an address of the group 1.

Through this method, the SRC indicating an address of the source device and the DST indicating an address of the destination device may be set, and a message including Bluetooth data may be transmitted to a desired device through the set SRC and DST.

Also, in another embodiment of the present invention, the devices illustrated in FIGS. 11 and 12 may determine whether a message received through the address set in the DST has been received from a device which is qualified to send data to the devices themselves.

That is, each device compares an address of the device set in the SRC field of the received message with an address set in the DST of each device, and in case where the addresses match, each device may determine that a corresponding device is qualified to send data to each device itself, and when the addresses do not match, each device may determine that the corresponding device is not qualified to send data to each device itself and discard the received message.

FIG. 13 is a view illustrating an example of a data format to which the present invention may be applied.

Referring to FIG. 13, the SRC and the DST discussed above with reference to FIG. 12 may be set through the setting message in the Bluetooth mesh network, and whether a transmitted message is a message requiring a response may be determined.

In detail, (a) to (d) of FIG. 13 illustrate an example of a transaction identifier (TID) field included in a message used in a general Bluetooth mesh network.

In the Bluetooth mesh network, the TID field may be used in case where two or more messages are linked in one transaction.

(a) of FIG. 13 illustrates a TID field in a general message. As illustrated in (a) of FIG. 13, the TID field in a general message may include an identifier field for identifying a message linked to an end bit indicating the end of a message.

(b) of FIG. 13 illustrates a TID field of a message for obtaining or setting information of a device in the mesh network. In (b) of FIG. 13, "Message Type" field indicates a type of a message.

Table 2 below illustrates an example of the "Message Type" field value.

TABLE 2

| Value | Type |
|---|---|
| 00 | Get |
| 01 | Set with Ack |
| 10 | Set without ACK |
| 11 | Status |

In Table 2, when the "Message Type" field value is "00", it indicates a message for requesting information from a specific device. That is, specific information may be obtained from a device of the mesh network by transmitting a message in which the "Message Type" field value is "00".

When the "Message Type" field value is "01" or "10", it indicates a message for setting a specific device. For example, a control device for setting the SRC or the DST described above with reference to FIG. 12 may transmit a message in which the "Message Type" is "01" or "10" to a switch or an electric bulb.

Here, the "Message Type" field is set to "01" when a response with respect to a message is required, and set to "10" when a response is not required.

When the "Message Type" field value is "11", it indicates a message for transmitting a state of a device.

(c) of FIG. 13 illustrates a TID field including a value indicating whether a response with respect to a message is required.

In (c) of FIG. 13, when a value of an "ACK" field is "1", the device which has received the message as described above with reference to FIG. 10 should transmit a response message, and when the value is "0", the device is not required to transmit a response message.

(d) of FIG. 13 illustrates a TID field including a value indicating obtaining or setting information of a device or whether a response is required.

In (d) of FIG. 13, when the ID value is "0", a device which has received a message may not transmit a response message, and when the ID value is "1", the device which has received a message should transmit a response message.

Also, according to a parameter value of a message including the TID, whether the message is a message requesting information or a message m for setting may be indicated.

For example, when the parameter value is a specific value, a message including the parameter may be a message requesting information of a device.

Figure 14:
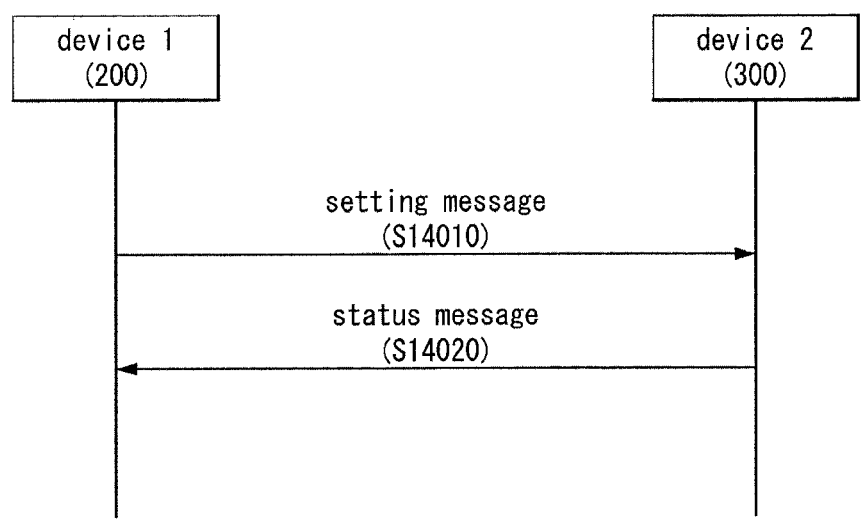
FIG. 14 is a flow chart illustrating an example of a method for allocating an address of a device in a mesh network, to which the present invention may be applied.

FIG. 14 is a flow chart illustrating an example of a method for allocating an address of a device in a mesh network, to which the present invention may be applied.

Referring to FIG. 14, within the Bluetooth mesh network described above with reference to FIG. 12, a source device address, a destination device address, and a group address of a device may be set through a setting message.

First, it is assumed that the first device 200 and the second device 300 form a Bluetooth mesh network and the first device knows an address of the second device.

When the first device wants to set an SRC field and/or DST field included in a message transmitted by the second device 300 to an address value of a specific device, the first device 200 may transmit a setting message to the second device (S14010).

Here, the setting message may include the TID field described above with reference to FIG. 13 and an address field including an address value desired to be set, and the address value may be an address value of a specific device or an address value of a group in which multiple devices are included.

The SRC field includes an address value of a source device transmitting a message, and the DST field includes an address value of a destination device receiving a message.

The TID field may be configured by one of the formats described above with reference to FIG. 13 and include an identifier (first identifier) indicating whether the first device 200 requests a response with respect to the setting message.

For example, when a value of the identifier is "1", the second device may respond to the setting message, and when the value of the identifier is "0", the second device may not respond.

Upon receiving the setting message, when the SRC field and/or the DST field may be set to an address value included in the address field, the second device 300 sets the SRC field and/or the DST field of a message transmitted from the second device 300 to the address value.

Thereafter, the second device transmits a status message (first status message) including status information indicating whether setting was successful, to the first device 200 (S14020).

However, if the second device cannot set the SRC field and/or the DST field to the address value included in the address field of the setting message, the second device transmits a status message including status information indicating setting failed, to the first device 200 (S14020).

Through this method, the first device 200 may set an address of the second device 300.

Figure 15:
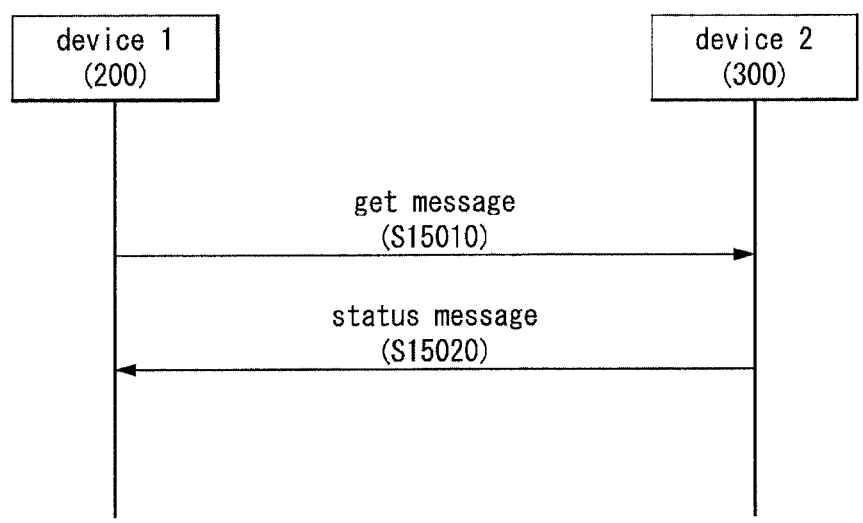
FIG. 15 is a flow chart illustrating an example of a method for obtaining an address of a device in a mesh network, to which the present invention may be applied

FIG. 15 is a flow chart illustrating an example of a method for obtaining an address of a device in a mesh network, to which the present invention may be applied.

Referring to FIG. 15, in the Bluetooth mesh network, the first device 200 may obtain an address value set in the second device 300 through a get message.

First, it is assumed that the first device 200 and the second device 300 form a Bluetooth mesh network and the first device knows an address of the second device.

When the first device 200 wants to get an address value set in the SRC field and/or the DST field included in a message transmitted from the second device 300, the first device 200 may transmit a get message to the second device (S15010).

Here, the get message may include the TID field described above with reference to FIG. 13.

The SRC field includes an address value of a source device transmitting a message, and the DST field includes an address value of a destination device receiving a message.

The TID field may be configured by one of the formats described above with reference to FIG. 13 and include an identifier (second identifier) indicating whether the first device 200 requests a response with respect to the get message.

For example, when a value of the identifier is "1", the second device may respond to the get message, and when the value of the identifier is "0", the second device may not respond.

Upon receiving the get message, the second device 300 may transmit a status message (second status message) to the first device in response thereto (S15020).

The status message may include an address field including an address value set in the second device and status information indicating whether a last operation (e.g., transmission of an address) of the second device was successful or failed.

Here, when the second device 300 can transmit the address value set in the second device to the first device 300, the address field may include an address value set in the second device and the status information may include a code value indicating success.

If, however, the second device 300 cannot transmit the address value set in the second device to the first device 300, the address field may not include the address value set in the second device and the status information may include a code value indicating failure.

Here, the address value may be one of the address value used by the second device in the mesh network, the address value set in the SRC field, and the address value set in the DST field.

In this manner, the first device 200 may check the address value set in the second device.

The configuration and method according to the embodiments of the present invention described above are not limited in its application, but the entirety or a portion of the exemplary embodiments may be selectively combined to be configured into various modifications.

The above-described present invention is not limited to the above-described embodiments and the accompanying drawings because those having ordinary skill in the technical field to which the present invention pertains can make various replacements, variations and modifications within the range which does not depart from the technical spirit of the invention.

INDUSTRIAL AVAILABILITY

The present invention relates to Bluetooth data transmission/reception and, more particularly, to a method and device for transmitting a message by setting an address of a device in a mesh network using a Bluetooth low energy (BLE) technology.

The invention claimed is:

1. A method for setting, by a control device, an address for a first device through a Bluetooth mesh network, the method comprising:
   transmitting, to the first device, a setting message for setting addresses related to message transmission of the first device for the first device,
   wherein the setting message includes at least one of (i) an address field including a first address value related to a first address for the first device and a second address value related to a second address for a destination of a message transmitted by the first device and (ii) a first identifier indicating whether a response to the setting message is requested,
   wherein the first address is set for the first device based on the first address value and the second address is set for the first device based on the second address value, and
   wherein the first address and the second address are used by the first device for transmitting the message to the destination within the Bluetooth mesh network;
   receiving a first status message from the first device including status information indicating whether the first address and the second address are successfully set in response to the setting message from the first device based on that the first identifier indicates the response is requested;
   transmitting a get message for getting the set first address and the set second address to the first device; and
   receiving a second status message including the set first address and the set second address in response to the get message.

2. The method of claim 1, wherein the first address value is used for setting a source address,
   wherein the source address is at least one of an address of a source device transmitting the message or an address of a device group including the first device,
   wherein the second address value is used for setting a destination address, and
   wherein the destination address is at least one of an address of a destination device receiving the message or an address of a device group including the destination device.

3. The method of claim 1, wherein the get message includes a second identifier indicating whether to request a response to the get message.

4. The method of claim 2, wherein the message includes at least one of a source device address field indicating an address of a device transmitting a message or a destination device address field indicating an address of a device receiving a message, and
   wherein the source address is included in the source device address field and the destination address is included in the destination device address field.

5. The method of claim 1, wherein the setting message and the first status message are transmitted and received through a Bluetooth GATT protocol.

6. The method of claim 5, further comprising:
   transmitting an advertising message to the first device;
   receiving a connection request message from the first device based on the advertising message; and
   performing an authentication procedure with the first device.

7. A device, as a control device, for setting an address of a first device through a Bluetooth mesh network, the device comprising:
   a communication unit communicating with the exterior wirelessly or wiredly; and
   a processor functionally connected to the communication unit,
   wherein the processor performs control to:
   transmit, to the first device, a setting message for setting addresses related to message transmission of the first device for the first device,
   wherein the setting message includes at least one of (i) an address field including a first address value related to a first address for the first device and a second address value related to a second address for a destination of a message transmitted by the first device and (ii) a first identifier indicating whether a response to the setting message is requested, wherein the first address is set for the first device based on the first address value and the second address is set for the first device based on the second address value, and wherein the first address and the second address are used by the first device for transmitting the message to the destination within the Bluetooth mesh network, receive a first status message from the first device including status information indicating whether the first address and the second address are successfully set in response to the setting message from the first device based on that the first identifier indicates the response is requested, transmit a get message for getting the set first address and the set second address to the first device, and receive a second status message including the set first address and the set second address of the first device in response to the get message.

* * * * *